United States Patent [19]

Hara et al.

[11] 4,349,908
[45] Sep. 14, 1982

[54] GAS LASER TUBE COMPRISING A CHANNEL-SHAPED HOLDER PAIR FOR COMPRESSIVELY HOLDING A BREWSTER PLATE AT PLATE CORNERS

[75] Inventors: Hiroo Hara; Noboru Taguchi, both of Tokyo, Japan

[73] Assignee: Nippon Electric Co., Ltd., Tokyo, Japan

[21] Appl. No.: 180,722

[22] Filed: Aug. 25, 1980

[30] Foreign Application Priority Data

Aug. 23, 1979 [JP] Japan .......................... 54-116128[U]

[51] Int. Cl.³ ............................................... H01S 3/02
[52] U.S. Cl. ...................................... 372/103; 372/98; 372/107
[58] Field of Search ...................... 331/94.5 D, 94.5 C, 331/94.56

[56] References Cited

U.S. PATENT DOCUMENTS 3,790,900  2/1974  Golser ........................... 331/94.5 D
4,064,466 12/1977  Seki et al. ...................... 331/94.5 D
4,216,438  9/1980  Seki et al. ...................... 331/94.5 D
4,240,046 12/1980  Kolb, Jr. et al. ............... 331/94.5 D Primary Examiner—William L. Sikes
Assistant Examiner—Léon Scott, Jr.
Attorney, Agent, or Firm—Sughrue, Mion, Zinn, Macpeak & Seas

[57] ABSTRACT

A linearly polarizing internal mirror type gas laser tube comprises a channel-shaped holder pair for axially compressively holding a Brewster plate in a hollow cylindrical space surrounded by an inside surface of a pipe. Each holder comprises a side wall pair and a connecting wall connecting the side wall pair. Each side wall has a pair of protrusions having a common axial end plane that provides the Brewster angle. The holders are brought into contact with the Brewster plate with the protrusions made to contact with corner portions of the plate. The side walls may have free ends spaced apart from the pipe inside surface. Alternatively, the side walls of at least one of the holders may have outwardly bent portions having free ends brought into contact with the pipe inside surface. It is readily possible to press shape the holders at low costs from a metal sheet.

5 Claims, 5 Drawing Figures

U.S. Patent    Sep. 14, 1982    4,349,908
FIG.1
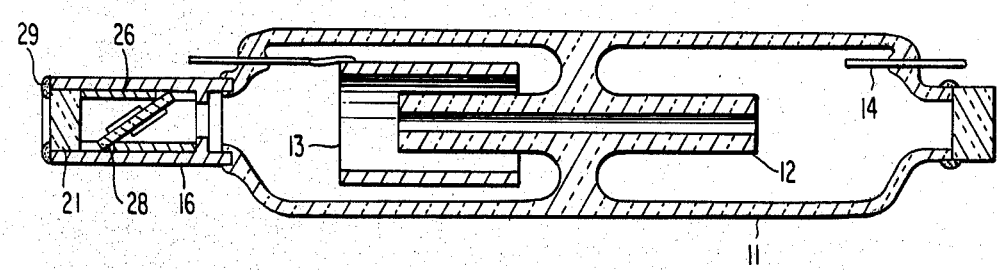
FIG.2
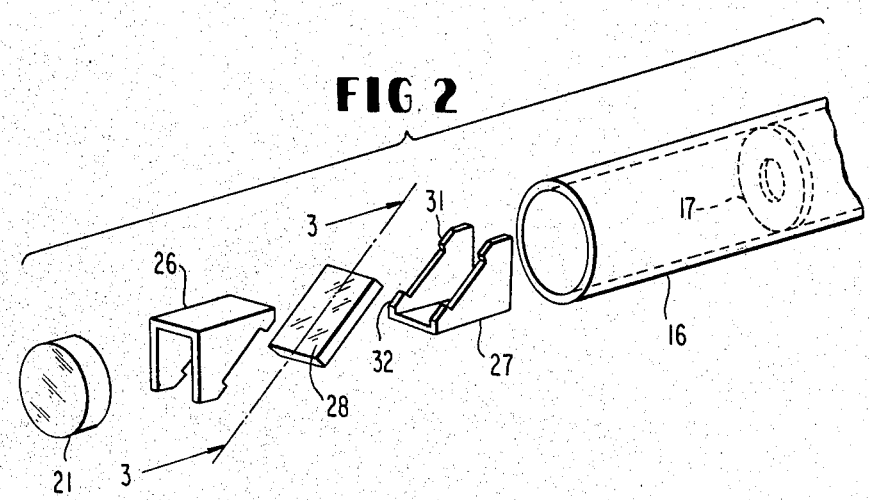
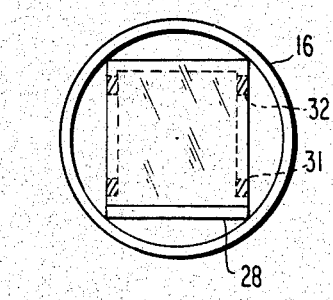
FIG.3
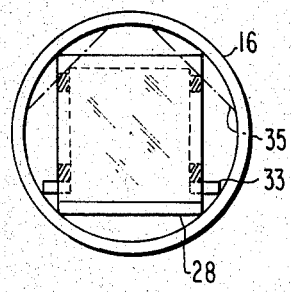
FIG.4
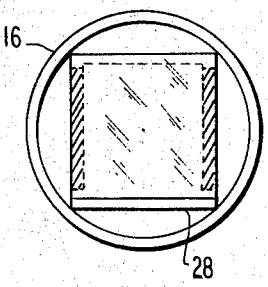
FIG.5

GAS LASER TUBE COMPRISING A CHANNEL-SHAPED HOLDER PAIR FOR COMPRESSIVELY HOLDING A BREWSTER PLATE AT PLATE CORNERS

BACKGROUND OF THE INVENTION

This invention relates generally to a linearly polarizing internal mirror type gas laser tube for use in, among others, optical data processing. More particularly, this invention relates to a gas laser tube comprising a pair of holders for compressively holding a Brewster plate in the laser tube.

As will later be described more in detail with reference to one of several figures of the accompanying drawing, a gas laser tube comprises a capillary in a gas-filled space enclosed with an envelope. Laser oscillation takes place through the capillary with those mirrors used as a resonator for the laser oscillation, which are placed axially on both sides of the capillary. When the mirrors are fixed to the respective axial ends of the evelope in direct contact with the gas-filled space, the laser tube is called an internal mirror type gas laser tube. A laser beam generated axially along the capillary is taken out through a predetermined one of the mirrors as an output laser beam.

It is preferred that the gas laser tube should comprise a plate which is transparent to the laser beam and has a pair of optical flat and parallel principal surfaces. The plate is fixedly held in the gas-filled space beween the capillary and one of the mirrors with the Brewster angle formed between a common normal to the principal surfaces and the axis of the laser beam or of the capillary. The output laser beam is substantially linearly polarized. The electric vectors of the linearly polarized output laser beam are on a plane perpendicular to the principal surfaces. In other words, the plane of polarization of the output laser beam is perpendicular to the plane of incidence of the laser beam reciprocating between the mirrors. As described in U.S. Pat. No. 3,790,900 issued to Hans Golser, assignor to Siemens Aktiengesellschaft, the plate is known as a Brewster plate in the art.

The Brewster plate must be held fixedly relative to the laser beam axis. Otherwise, it is impossible to keep the output laser beam excellently linearly polarized. Furthermore, the laser oscillation becomes unstable.

An example of the linearly polarizing internal mirror type gas laser tube is revealed in U.S. Pat. No. 4,064,466 issued to Fumio Seki et al., assignors to the present assignee. According to Seki et al, the Brewster plate is held in a hollow cylindrical seal casing or external holder communicating with the gas-filled space. For this purpose, a hollow cylindrical internal holder is provided with an axial end cut to the Brewster angle. The internal holder is snugly received in the external holder with the other axial end fixedly supported by the external holder. The Brewster plate is interposed between the internal holder and another similar internal holder and is secured in position and orientation by an axial compressive force produced as a result of differences in the coefficients of thermal expansion between the external holder and members placed between the fixed axial ends of the respective internal holders.

When applied with too strong an axial compressive force, the Brewster plate is subjected to deformation. Strains brought about in the Brewster plate result in undesired production of electric vector components parallel to the Brewster plate to deteriorate the linear polarization of the output laser beam, The laser tube disclosed in the above-cited U.S. Pat. No. 4,064,466 is excellent in this respect because the internal holders are brought into contact with the Brewster plate only at four corners thereof. The internal holders are, however, expensive because it has been necessary to manufacture each internal holder for a metal pipe or from a glass pipe. Moreover, it has been troublesome to evacuate very narrow spaces formed between the external holder and the respective internal holders.

SUMMARY OF THE INVENTION

It is therefore an object of the present invention to provide a linearly polarizing internal mirror type gas laser tube, which is capable of stably producing an excellently linearly polarized output laser beam.

It is another object of this invention to provide a linearly polarizing internal mirror type gas laser tube of the type described, which is not expensive.

It is a specific object of this invention to provide a linearly polarizing internal mirror type gas laser tube of the type described, wherein a Brewster plate is held by a holder pair, which is readily manufactured at a low expense.

It is another specific object of this invention to provide a linearly polarizing internal mirror type gas laser tube of the type described, which is readly manufactured by evacuating a hollow space in the tube and filling the evacuated space with a gas for the tube.

A linearly polarizing internal mirror type gas laser tube to which this invention is applicable, comprises a first and a second mirror, an arrangement surrounding a main hollow space and having an arrangement axis and a first and a second arrangement end, a pipe having an inside surface surrounding an additional hollow space and having a first pipe end and a second pipe end connected to the first arrangement end with the pipe aligned with the arrangement axis and with the additional hollow space brought into communication with the main hollow space, a Brewster plate having a periphery and interposed between the first and the second holders in the additional hollow space with the periphery at least partly spaced apart from the inside surface, and means for fixing the first and the second mirrors to the first pipe end to close the additional hollow space and to the second arrangement end to close the main hollow space, respectively. The arrangement is for generating, in cooperation with the first and the second mirrors, a laser beam in alignment with the arrangement axis. The pipe and the first and the second holders hold the Brewster plate by an axial compressive force.

According to this invention, each of the first and the second holders comprises a pair of side walls and a connecting wall having a wall axis and connecting the side walls so that the side and the connecting walls may form a shape of a channel beam. Each side wall has a free end parallel to the wall axis and a first and a second protrusion parallel to the wall axis. The first and the second protrusions are adjacent to the free end and remote therefrom, respectively. The first and the second protrusions of each holder have axial end surfaces which are on a common plane. The common plane has a normal forming the Brewster angle with the wall axis. The first and the second protrusions of each holder are in substantial alignment with the second and the first protrusions of the other of the first and the second holders, respectively, when the first and the second holders hold the Brewster plate by the axial compressive force with the wall axes put parallel to the arrangement axis.

BRIEF DESCRIPTION OF THE DRAWING

FIG. 1 is an axial sectional view of a linearly polarizing internal mirror type gas laser tube according to an embodiment of the instant invention;

FIG. 2 is a perspective exploded view of a portion of the gas laser tube depicted in FIG. 1;

FIG. 3 is a transverse sectional view taken on a line 3—3 indicated in FIG. 2;

FIG. 4 is a like transverse sectional view of a linearly polarizing internal mirror type gas laser tube according to a modification of the tube shown in FIGS. 1 through 3; and FIG. 5 is a similar transverse sectional view of a linearly polarizing internal mirror type gas laser tube for use as a reference.

DESCRIPTION OF THE PREFERRED EMBODIMENTS

Referring to FIGS. 1 through 3, a linearly polarizing internal mirror type gas laser tube according to an embodiment of the present invention comprises a casing 11 surrounding a main hollow space and having a first and a second casing end. The casing 11 may be made of glass and holds an integral capillary 12 having a capillary axis. A cylindrical cold cathode 13 is sealed to the casing 11 surrounding one end portion of the capillary 12. An anode 14 is sealed to the casing 11 on the other side of the capillary 12.

A pipe 16 has an inside surface surrounding an additional hollow space and has a first and a second pipe end. The second pipe end is sealed to the first casing end with the pipe 16 aligned with the capillary axis and with the additional hollow space brought into communication with the main hollow space. Adjacent to the second pipe end, the pipe 16 has a flange 17 radially inwardly projecting from the inside surface. The flange 17 may be manufactured separately of the pipe 16 and brazed or otherwise fixed to the inside surface by the use of a jig.

A first mirror 21 is fixed to the first pipe end to close the additional hollow space. A second mirror 22 is fixed to the second casing end to close the main hollow space. One of the mirrors 21 and 22 is half silvered. Preferably, the second mirrow 22 is the half silvered mirror. The mirrors 21 and 22 may adjustably be attached to the respective ends at first in any one of the manners known in the art. At any rate, an envelope is thereby formed to enclose the main and the additional hollow spaces.

Before closure of the first pipe end, first and second holders 26 and 27 are put into the pipe 16 with a Brewster plate 28 interposed. After the laser tube is thus assembled, the space enclosed with the envelope is evacuated and then filled with a gas, such as a mixture of helium and neon, in the manner known also in the art. The Brewster plate 28 should have a periphery that is at least partly spaced apart from the inside surface of the pipe 16.

A gas discharge is caused to occur between the cathode 13 and the anode 14 through the capillary 12. Laser oscillation takes place through the capillary 12 with the mirrors 21 and 22 used as a resonator for the laser oscillation. After adjusted to provide an optimum resonator, the mirrors 21 and 22 are fixed in position and orientation by the use of an appropriate device known in the art. The fixing device is exemplified by a mass of glass frit or the like 29 at each end of the envelope. The capillary 12, the cathode 13, and the anode 14 form an arrangement, together with other elements as, for example, the gas filled in the envelope, for generating a laser beam. The capillary axis serves as an arrangement axis, along which the laser beam is generated. As described hereinabove, the Brewster plate 28 substantially linearly polarizes the laser beam. An output laser beam is taken out through the half silvered mirror 22. The laser beam is polarized so that the electric vectors are on a plane perpendicular to the Brewster plate 28.

As described in detail in the above-referenced U.S. Pat. No. 4,064,466, the pipe 16 and the first and the second holders 26 and 27 hold the Brewster plate 28 fixedly in position and orientation by applying an axial compressive force thereto at corners of the Brewster plate 28. For this purpose, at least one of the holders 26 and 27 is made of a material having a smaller coefficient of thermal expansion than the pipe 16. The first and the second holders 26 and 27 are fixedly supported by the pipe 16 at their ends remote from the Brewster plate 28 by the first mirror 21 and the flange 17.

Each of the first and the second holders 26 and 27 is manufactured by bending a metal sheet into a shape of a channel beam. In other words, each holder 26 or 27 comprises a pair of side walls and a connecting wall having a wall axis and connecting the side walls so that the side and the connecting walls may form the channel beam. Each side wall has a free end parallel to the wall axis and first and second protrusions, such as 31 and 32, parallel to the wall axis. The first and the second protrusions 31 and 32 are adjacent to the free end and remote therefrom, respectively. The first and the second protrusions 31 and 32 of each holder 26 or 27 have axial end surfaces on a common plane, which has a normal forming the Brewster angle with the wall axis. The first and the second protrusions 31 and 32 on one of the first and the second holders 26 and 27 are in substantial alignment with the second and the first protrusions of the other of the first and the second holders 26 and 27, respectively, when the first and the second holders 26 and 27 hold the Brewster plate 28 by the axial compressive force, with the wall axes thereof disposed parallel to the arrangement axis.

It is preferred that the second protrusion 32 of each holder 26 or 27 should be axially farther protruded than the first protrusion 31. This is for bringing the edges between each connecting wall and the side wall pair into contact with the inside surface of the pipe 16 as depicted in FIG. 3 and also for placing the connecting walls of the respective holders 26 and 27 farther from the laser beam axis. This also prevents the free ends of the side walls of the holders 26 and 27 from being pressed against the inside surface and thereby inwardly bent by the axial compressive force unless the holders 26 and 27 are made of a considerably rigid metal plate. As shown also in FIG. 3, each side wall may be planar and has the free ends out of contact with the inside surface.

Referring to FIG. 4, each side wall of at least one of the first and the second holders 26 and 27 may alternatively have an outwardly bent portion 33 having the free end. The free ends of the bent portions may be brought into contact with the inside surface of the pipe 16 by the axial compressive force at the temperature at which the laser tube is kept in operation. The side walls may be thereby somewhat inwardly bent when the holder is made of a thin metal sheet flexible to an appreciable extent. With the common plane made to form an angle preliminarily designed, it is nevertheless possible to insure the correct Brewster angle.

In contrast to the fact that it is difficult to manufacture from a metal sheet the internal cylindrical holder used according to Seki et al, the holders 26 and 27 are readily manufactured at low costs by press shaping the same so as to provide the exact Brewster angle. It is readily feasible to evacuate the relatively wide spaces formed between the inside surface of the pipe 16 and the outside surfaces of the holders 26 and 27. In addition, it is rendered possible to make the pipe 16 have a pair of projections radially inwardly projected from the inside surface adjacently of the first pipe end. The projections should have radially inwardly directed ends, such as 35, that will not stand in the way of insertion of the holders 26 and 27 and the Brewster plate 28 into the additional hollow space. With the holders 26 and 27 rotated around the pipe axis together with the Brewster plate 28 after the insertion, it is possible to make the projection pair serve to axially support that axial end of the first holder 26 which is remote from the first and the second protrusions.

With a typical laser tube having the structure illustrated with reference to FIGS. 1 through 3, it was possible to achive as high a degree of polarization as 300 when the laser output was 1.5 mW. For reference, a laser tube was manufactured with the first and the second protrusions, such as 31 and 32, omitted from the first and the second holders 26 and 27. Axial end surfaces forming the exact Brewster angle were brought into contact with the Brewster plate 28 as indicated in FIG. 5 by hatched areas. The degree of polarization was only 100 when the laser output was 1.3 mW. The degree of polarization was measured by the ratio of intensity of the laser output beam passing through a parallel Nicol to that of the laser output beam passing through a crossed Nicol. Incidentally, the first and the second protrusions are in contact with the Brewster plate 28 parallel to the plane of incidence. Merely for convenience of illustration, the connecting walls of the holders 26 and 27 are depicted in FIG. 1 in contact with the inside surface of the pipe 16. In FIGS. 3 through 5, the connecting walls of the second holders 27 are shown on the top side rather than on the bottom side, where they should actually be according to FIGS. 1 and 2.

What is claimed is:

1. An internal mirror type gas laser tube comprising a cylindrical casing for containing a laser active medium therein, and first and second mirrors disposed at opposite ends of said cylindrical casing, said cylindrical casing including at one of said opposite ends a metallic cylindrical member, a first flexible metallic holder inserted in said metallic cylindrical member, a Brewster plate inserted in said metallic cylindrical member and abutted against said first flexible metallic holder with a pressure in a direction toward the central portion of said cylindrical casing, a second flexible metallic holder inserted in said metallic cylindrical member and abutted against said Brewster plate with a pressure in said direction, and means for applying a pressure to said second flexible metallic holder in said direction, each of said first and second flexible metallic holders having a pair of side walls extending in parallel with each other and in the axial direction of said metallic cylindrical member and means disposed in parallel with the axial direction of said metallic cylindrical member for connecting said side walls to each other, each of said side walls having a plurality of protrusions at its one edge portion on the side of said Brewster plate, the protrusions of each of said first and second flexible metallic holders forming a Brewster cut surface and being abutted against said Brewster plate.

2. The internal mirror type gas laser tube as claimed in claim 1, wherein said metallic cylindrical member is provided with a flange radially inwardly projecting from its inside surface for supporting said first flexible metallic holder on the opposite side from said Brewster plate.

3. The internal mirror type gas laser tube as claimed in claim 2, wherein said first mirror contacts with said second flexible metallic holder on the opposite side from said Brewster plate and said applying means includes means for rigidly fixing said first mirror to said metallic cylindrical member.

4. The internal mirror type gas laser tube as claimed in claim 1, wherein each side wall of at least one of said first and second flexible metallic holders has a free end provided with an outwardly bent portion.

5. The internal mirror type gas laser tube as claimed in claim 1, wherein at least one of said first and second flexible metallic holders is made of a metal having a smaller coefficient of thermal expansion than the metal of said metallic cylindrical member.

* * * * *

UNITED STATES PATENT AND TRADEMARK OFFICE
CERTIFICATE OF CORRECTION

PATENT NO.   : 4,349,908
DATED        : Sept. 14, 1982
INVENTOR(S)  : Hiroo Hara et al It is certified that error appears in the above—identified patent and that said Letters Patent is hereby corrected as shown below:

Column 1, line 22 - change "evelope" to --envelope--;

Column 2, line 2 - change "," to -- . --;

Column 2, line 8 - change "for" to --from--;

Column 2, line 28 - change "readly" to --readily--;

Column 5, line 27 - change "achive" to --achieve--.

Signed and Sealed this

Twenty-second Day of February 1983

|SEAL|

Attest:

GERALD J. MOSSINGHOFF

Attesting Officer    Commissioner of Patents and Trademarks